(12) United States Patent
Aben et al.

(10) Patent No.: US 11,009,363 B2
(45) Date of Patent: May 18, 2021

(54) NON-UNIFORM WEIGHTING FACTOR AS ROUTE ALGORITHM INPUT

(75) Inventors: Sjoerd Aben, Alkmaar (NL); Teun De Haas, Utrecht (NL); Erik Thomassen, Amsterdam (NL); Breght Boschker, Hilversum (NL)

(73) Assignee: TOMTOM NAVIGATION B.V., Amsterdam (NL)

( * ) Notice: Subject to any disclaimer, the term of this patent is extended or adjusted under 35 U.S.C. 154(b) by 714 days.

(21) Appl. No.: 13/977,790

(22) PCT Filed: Dec. 31, 2010

(86) PCT No.: PCT/EP2010/070967
§ 371 (c)(1),
(2), (4) Date: Sep. 30, 2013

(87) PCT Pub. No.: WO2012/089279
PCT Pub. Date: Jul. 5, 2012

(65) Prior Publication Data
US 2014/0046584 A1    Feb. 13, 2014

(51) Int. Cl.
*G01C 21/34* (2006.01)

(52) U.S. Cl.
CPC ..... *G01C 21/3492* (2013.01); *G01C 21/3453* (2013.01); *G01C 21/3461* (2013.01)

(58) Field of Classification Search
CPC . G01C 21/34; G01C 21/3446; G01C 21/3453
See application file for complete search history.

(56) References Cited

U.S. PATENT DOCUMENTS

| | | | |
|---|---|---|---|
| 6,269,303 B1 * | 7/2001 | Watanabe | G01C 21/3461 340/988 |
| 8,014,941 B2 | 9/2011 | Nagel et al. | |
| 2002/0169543 A1 | 11/2002 | Blewitt | |
| 2004/0215390 A1 * | 10/2004 | Nomura | G01C 21/3461 701/425 |

(Continued)

FOREIGN PATENT DOCUMENTS

| | | |
|---|---|---|
| EP | 0747671 A2 | 12/1996 |
| EP | 1505370 A1 | 2/2005 |
| EP | 1867952 A1 | 12/2007 |

OTHER PUBLICATIONS

International Search Report dated Nov. 7, 2011 for International Application No. PCT/EP2010/070967.

*Primary Examiner* — Imran K Mustafa
(74) *Attorney, Agent, or Firm* — Park, Vaughan, Fleming & Dowler LLP (57) ABSTRACT

The present invention provides a method of determining a route between two locations in a navigation device by calculating the cost of paths between the two locations using a cost function. The cost function applies different weighting factors for the same type of attribute to line segments when the line segments are located in different areas of a map. As such, when the cost of a path is being assessed, the same type of attribute may be associated with different levels of penalty or bonus in different areas. This means that the route determined is less likely to avoid line segments that have a certain negative attribute in areas where the attribute has a less adverse affect.

21 Claims, 4 Drawing Sheets

(56) References Cited

U.S. PATENT DOCUMENTS

| | | | |
|---|---|---|---|
| 2005/0107950 A1* | 5/2005 | Gelhar | G01C 21/3446 340/990 |
| 2010/0036606 A1* | 2/2010 | Jones | G01C 21/3446 701/533 |
| 2010/0286908 A1* | 11/2010 | Tate, Jr. | G01C 21/3469 701/533 |
| 2011/0040438 A1* | 2/2011 | Kluge | G01C 21/3469 701/31.4 |

\* cited by examiner

NON-UNIFORM WEIGHTING FACTOR AS ROUTE ALGORITHM INPUT

CROSS-REFERENCES TO RELATED APPLICATIONS

This application is the National Stage of International Application No. PCT/EP2010/070967 filed Dec. 31, 2010 and designating the United States. The entire content of this application is incorporated herein by reference.

FIELD OF THE INVENTION

This invention relates to navigation devices, to methods of navigating and to methods for displaying navigation maps and routes. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

As described above, navigation devices are of great use in determining a good route between two locations. When a navigation device determines a route between two locations it selects a route from a number of different possible paths for use in navigation. The preferred route is often selected by calculating a cost associated with each path and then selecting the path with the lowest cost. This is often done by associating a cost with each segment of road and then combining the costs of the segments of road in each path to give the total cost for the path. The cost associated with a given road segment depends on which attributes are desired for the journey and which are undesired. For example, if a scenic route is desired then all road segments in national parks may be associated with a fixed bonus cost, whereas all secondary roads may attract a fixed penalty cost since they may lead to traffic congestion.

The inventors have recognized that assessing the cost of a path in this manner does not always provide the best route for the user. This is particularly the case when the category of route selected by the user requires more than one type of road attribute to be taken into consideration for selecting the optimum route.

The present invention aims to provide an improved method of navigation.

SUMMARY OF THE INVENTION

The present invention provides a method of determining a route between two locations in a navigation device, wherein each path between the two locations is considered to be formed of a plurality of line segments and at least some of said line segments forming the paths have a first type of attribute associated with them, the method comprising:

providing a cost function for the first type of attribute, wherein the cost function has been derived by dividing a map into a plurality of areas and assigning a weighting factor to each area, wherein at least some of the areas have different weighting factors for said first type of attribute so as to indicate that the line segments having said first type of attribute in those different areas have different levels of desirability for the route to travel through them; and applying said cost function to line segments in paths passing through said areas for use in determining which path should be selected for said route between the two locations;

wherein the step of applying said cost function comprises assigning one of said weighting factors to each of the line segments having said first attribute, the weighting factor assigned to a given line segment being the weighting factor for the area in which the line segment is located. The weighting factors are therefore assigned to the line segments having the first attribute and which are in the paths passing through the first areas According to the present invention, line segments having the same type of attribute are not associated with the same, constant weighting factor for that attribute in all locations. In contrast, different weighting factors may be given for the same type of attribute when the line segments are located in different areas. As such, when the cost of a path is being assessed, the same type of attribute may be associated with different levels of penalty or bonus in different areas, the penalty or bonus being reflective of the different affects that the same attribute may have on the route in the different areas. This means that the route determined is less likely to avoid line segments that have a certain negative attribute in areas where the attribute has a less adverse affect. Conversely, the route determination is less likely to use line segments that have a certain positive attribute in areas where the attribute has a less positive affect.

For the avoidance of doubt, the term 'line segment' is intended to mean a section of a path. Any given path in a map is formed from a plurality of these line segments. The line segment may be a segment of any type of road, foot path other type of conduit that could be considered by the navigation device when determining the route.

The term 'area' used in relation to a cost function is intended to mean a geographical area of the map from which the cost function is derived. The term is not intended to cover a single road or a single segment of road (i.e. line segment). Preferably, each of the areas described herein includes a plurality of conduits (e.g. roads) and preferably includes a plurality of different types of conduit. For example, each area may comprise at least two types of conduit selected from the following types of conduit: highways, secondary roads, lanes, foot paths etc. Preferably, the size of any one given area may, for example, be more than 1 square kilometre, more than 2 square kilometres, more than 4 square kilometres, or more than 6 square kilometres.

The present invention provides different weighting factors for line segments in different areas. A weighting factor indicates the level of desirability that a line segment should be used in a route and so line segments having different weighting factors have different levels of desirability for being included in the route. The actual values of the weighting factors are not important. What is important is that when an attribute is considered to be more desirable it is associated with a weighting factor closer to one end of the scale and when an attribute is considered to be less desirable it is associated with a weighting factor closer to the other end of the scale. For example, when labelling weighting factors in terms of numbers, weighting factors having more positive values might be considered to represent that the attribute is more desirable (or less undesirable).

Preferably, the weighting factors used according to the invention are such that the line segments may be considered during the route determination, it is just that a weighting factor indicates the desirability to use a line segment in the route. In other words, a weighting factor is not equivalent to excluding road segments having a certain attribute from being considered or used in a route.

The cost of a given path is preferably assessed by combining the weighting factors for the line segments forming the path. It is important to note that any given line segment may be associated with one or more attributes and may therefore have one or more corresponding weighting factors. The type of route that is preferred will indicate which attributes, and therefore which weighting factors, should be considered when calculating the cost of the path. If more than one attribute is to be considered when calculating the cost of a path then a given line segment may have more than one weighting factor which will contribute to the total cost of the path.

Accordingly, the method preferably comprises selecting a category of route that requires the first type of attribute to be taken into account and only then applying the cost function to determine a route between the two locations. The first attribute may be one which is either desirable or undesirable for the type of route selected. For example, the method may comprise a user selecting the category of a scenic route and the attribute then considered is line segments that are located in a national park. The cost function will then associate different weighting factors with these line segments depending upon which areas they are within, representing that it is more desirable to use line segments that are within national parks in certain geographical areas than in other areas.

Preferably, the category of route selected also requires at least a second type of attribute to be taken into account for determining the route.

At least some of the line segments forming the paths preferably have at least a second type of attribute associated with them. The method may then comprise providing a second cost function for the second type of attribute and applying the second cost function to line segments in the paths for use in determining which path should be selected for the route between the two locations.

The same weighting factor may be applied to all line segments having the second type of attribute. However, it is preferable that the second cost function has been derived by dividing a map into a plurality of second areas and assigning a weighting factor to each of the second areas. At least some of the second areas have different weighting factors for the second type of attribute so as to indicate that the line segments having the second type of attribute in those different areas have different levels of desirability for the route to travel through them. The second cost function is applied to line segments in paths passing through the second areas for use in determining which path should be selected for the route between the two locations. The step of applying the second cost function comprises assigning one of the weighting factors of the second cost function to each of the line segments having the second attribute, the weighting factor assigned to a given line segment being the weighting factor for the second area in which the line segment is located.

Preferably, the category of route selected requires the second type of attribute to be taken into account for determining the route. The method preferably only then applies the cost function for the second attribute in order to determine a route between the two locations. The second attribute may be one which is either desirable or undesirable for the type of route selected. For example, the method may comprise a user selecting the category of a scenic route. As in the example above, the first attribute may then be considered to be line segments which are in a national park. The second attribute may be considered to be, for example, line segments which form parts of secondary roads. By 'secondary roads' it is meant roads which are smaller or which have slower speed limits than highways. The cost function for the second attribute will then associate a weighting factor with these line segments which represents the desirability of using line segments form parts of secondary roads. The second cost function will then associate different weighting factors with these line segments depending upon which of the second areas they are within, representing that it is more undesirable to use line segments that are secondary roads in certain geographical areas as compared to other geographical areas.

Preferably, the category of route selected also requires at least a third type of attribute to be taken into account for determining the route.

At least some of the line segments forming the paths preferably have a third type of attribute associated with them. The method may then comprise providing a third cost function for the third type of attribute and applying the third cost function to line segments in the paths for use in determining which path should be selected for the route between the two locations.

The same weighting factor may be applied to all line segments having the third type of attribute. However, it is preferable that the third cost function has been derived by dividing a map into a plurality of third areas and assigning a weighting factor to each of the third areas. At least some of the third areas have different weighting factors for the third type of attribute so as to indicate that the line segments having the third type of attribute in those different areas have different levels of desirability for the route to travel through them. The third cost function is applied to line segments in paths passing through the third areas for use in determining which path should be selected for said route between the two locations. The step of applying the third cost function comprises assigning one of the weighting factors of the third cost function to each of the line segments having said third attribute, the weighting factor assigned to a given line segment being the weighting factor for the third area in which the line segment is located.

As mentioned above, the category of route selected preferably requires the third type of attribute to be taken into account for determining the route. The method preferably only then applies the cost function for the third attribute in order to determine a route between the two locations. The third attribute may be one which is either desirable or undesirable for the type of route selected.

Preferably, the category of route selected also requires at least a fourth type of attribute to be taken into account for determining the route.

At least some of the line segments forming the paths preferably have a fourth or further type of attribute associated with them. The method may then comprise providing a fourth or further cost function for said respective fourth or further type of attribute and applying the fourth or further cost function to line segments in the paths for use in determining which path should be selected for the route between the two locations. Each of the fourth or further cost function may be applied in a corresponding manner as the first, second or third cost functions described above.

Any given line segment may have one or more attributes associated with it. A given line segment may therefore have any one of the first to fourth or further attributes, or may have any combination of any number of the first to fourth or further attributes.

The maps from which the first, second, third, fourth or further cost functions are derived may be the same map or may be different maps. The first, second, third, fourth or further areas of the cost functions are preferably not the same areas, but are different areas. The areas of the different cost functions may be different in one or more of the following respects; size of areas, shape of areas, number of areas, or geographical location of areas.

Preferably, the areas of the cost functions are areas located between the two locations.

All of the line segments in at least one of the areas of a given cost function may have the respective attribute associated with them such that the cost function is applied to all line segments in the paths within this area. For example, all of the line segments in at least one of said first areas may have the first attribute associated with them such that the first cost function is applied to all line segments in the paths within this area.

Alternatively, only some of the line segments in at least one of the areas of a given cost function have the respective attribute associated with them such that the cost function is applied to only some of the line segments in the paths within this area. For example, only some of the line segments in at least one of said first areas have said first attribute associated with them such that the first cost function is applied to only some of the line segments in the paths within this area.

Preferably, at least one of the attributes that is considered in determining the route is a type of road and the weighting factors of the respective cost function indicate the desirability to use that type of road in different areas. For example, the attribute may be selected from the following: highway roads, secondary roads, coastal roads, national park road, or roads with a maximum speed limit either above or below a predetermined speed.

Preferably, at least one of the attributes that is considered in determining the route is the likelihood of delays in travel time along line segments, and the respective cost function provides different weighting factors indicating different amounts of expected delay in different areas. For example, at least one of the attributes that is considered may indicate the likelihood of a delay due to a traffic accident and the areas of the cost function may, for example, indicated accident blackspots. As another example, at least one of the attributes that is considered may indicate the likelihood of a delay due to traffic congestion and the areas of the cost function may indicate areas where the delays are expected to be different.

Preferably, at least one of the attributes that is considered in determining the route is an attribute that indicates the likelihood of delays in travel time within city or town areas and the respective cost function provides weighting factors indicating different amounts of expected delays in different cities/towns or different areas of the same city/town.

Preferably, at least one of the attributes that is considered in determining the route is an attribute that indicates the likelihood of delays in travel time for a particular mode of transport, vehicle height, vehicle width or vehicle weight, and wherein the respective cost function indicates different amounts of expected delay in different areas for the attribute. The mode of transport may be, for example, by lorry, truck, motorbike, bicycle or pedestrian on foot.

Preferably, at least one of the attributes that is considered in determining the route is a physical aspect of the line segment, such as the width of the road forming the line segment, the height of bridges on the line segment, or the weight bearing capacity of the line segment. The weighting factors of the respective cost function indicate different values for the same physical aspect. For example, the weighting factors may indicate different widths of roads forming the line segments, different heights of bridges on the line segments, or the different weight bearing capacities of the line segments.

Other attributes are also contemplated. For example, at least one of the attributes that is considered in determining the route may be the difficulty of driving or navigating along line segments, and the respective cost function provides different weighting factors indicating different amounts of difficulty in different areas. For example, the weighting factors of the cost functions may be determined based on whether the line segment is a one way road or based on the clarity of sign posting for the segment etc.

It will be appreciated that the present invention intends to encompass the use of a single attribute, such as one of those described above. However, it is preferably according to the invention to use a combination of two or more attributes in determining the route. The attributes may be selected from those described above.

It is contemplated herein that at least on area and/or at least one weighting factor of one or more of the cost functions may change depending on the time of day or night. Information in order to implement this change may be stored on the navigation device and the navigation device may have a clock in order to trigger the implementation. Alternatively, the method may involve transmitting updated areas and/or weighting factors from a server to the navigation device, preferably wirelessly.

Preferably, at least one area and/or at least one weighting factor of one or more of the cost functions is calculated or updated using feedback from one or more navigation devices or from one or more users of navigation devices.

The feedback could be collected, for example, via questionnaires, voting systems, or web sites for interest groups (e.g. bikers, truckers, leisure, delivery companies). In order to calculate or update the weighting factors and/or areas of the respective cost functions an analysis may be performed as to why people take routes that differ from the one that is currently calculated by their navigation device. This information may be taken from people using routes in the vicinity of the areas of the respective cost functions. For example, the information may be taken from people in the community in or near the areas of the cost function.

Alternatively, the method comprises receiving the feedback directly into the navigation device. For example, the at least one weighting factor and/or at least one area of a given cost function may be preset on the navigation device. After travelling a route the navigation device may automatically seek feedback on the route from the user, such as by asking one or more questions about the route. The weighting factor and/or area may then be adjusted based on the feedback to these questions. This enables the weighting factors and/or areas to be adjusted over time. For example, the navigation device may start off with a weighting factor of −99 points for secondary roads, but over time this value changes based on user input in response to questions. Exemplary questions include "Did you enjoy the secondary roads on your route?" or "Did you find this city centre easy to navigate through?" If the user feedback into the device is negative then this would then cause the value of the weighting factor of an area to be altered to say −150 points.

As another example, at least one of the weighting factors and/or at least one of the areas of one or more cost function may initially be preset to be different on different navigation devices. The weighting factor and/or area on the different devices may be based on a common weighting factor and/or area, but each device has an offset applied to the weighting factor and/or area. The offsets may be random offsets about the common weighting factor and/or area. By evaluating the feedback on routes provided by the different devices or by the users of the devices and also by knowing the initial weighting factors and/or areas for the different devices, the optimal weighting factor and/or area may be selected from the different initial weighting factors and/or areas.

Alternatively, the navigation device may monitor its location during a journey and determine when its location deviates away from the route that has been determined. These deviations may be automatically collected and used as feedback to alter the weighting factors and/or areas. The deviations may be used by the navigation device to change the weighting factors and/or areas on the navigation device or may be transmitted to a remote server for analysis. The analysis may determine that a change in the weighting factors and/or areas is required and instructions may then be sent to the navigation device to implement this change. The analysis may be performed based on feedback regarding deviations collected by a single navigation device or based on feedback from multiple navigation devices.

It will therefore be appreciated that the feedback may be collected automatically by the navigation device, input by the user into the navigation device, or collected in other ways, such as via questionnaires. When the feedback is collected automatically by the navigation device or is input into the navigation device by the user, the navigation device may use the feedback to calculate or update the weighting factor and/or area. Alternatively, the navigation device may send the feedback to a remote server. The weighting factor and/or area may then be calculated or updated remotely based on this feedback and then instructions sent from a remote server to the navigation device for implementing the calculated or updated weighting factor and/or area on the navigation device for use in determining a new route.

Preferably, the calculations or updates are performed based on feedback from multiple navigation devices. The weighting factors and/or areas may be calculated or updated based on an average of the feedback results.

It is also contemplated that the weighting factors and/or areas may be calculated or updated based on feedback from only certain categories of users, e.g. motorcyclists, truck drivers or pedestrians.

Preferably, the method further comprises controlling a visual display and/or audio speaker to inform a user of the route determined. The navigation device preferably determines its geographical location and preferably also its orientation. The method preferably uses this location and/or orientation to determine which direction the navigation device should be moved in so as to follow said route. The display and/or speaker is then preferably controlled so as to instruct a user to follow this direction.

The present invention also provides a navigation device for performing the method(s) described above.

Therefore, from another aspect the present invention provides a navigation device as claimed in claim 20.

The map data and/or cost function is preferably stored on the navigation device. However, less preferably the map data and/or cost function may be located on a server that is remote from the navigation device and the navigation device may access the map data and/or cost function wirelessly.

It will be appreciated that corresponding map data and cost functions may also be provided for the second, third, fourth or further attributes.

The device preferably includes one or more processors for performing the functions described.

As described above, one or more remote servers may interact with the navigation device. The present invention therefore also provides a system comprising the navigation device and one or more servers which interact with the navigation device, for example, to perform the methods using a server that have been described above.

BRIEF DESCRIPTION OF THE DRAWINGS

Various embodiments of the present invention will now be described with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

Figure 1:
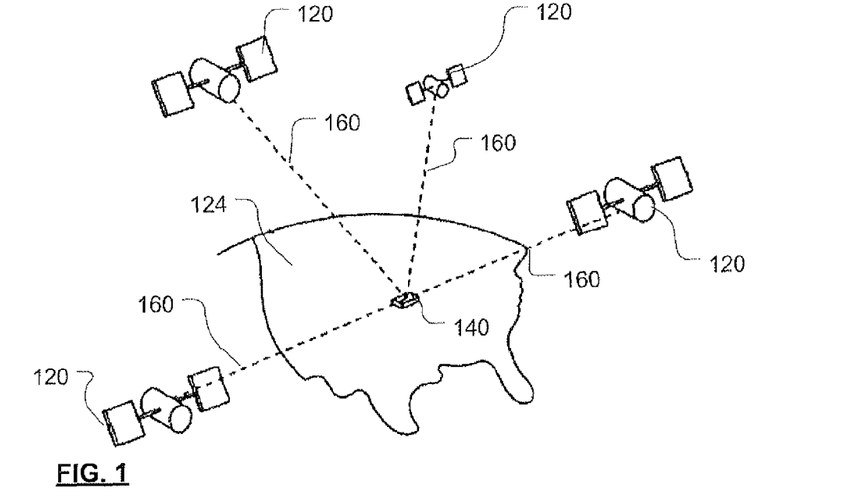
FIG. 1 is a schematic illustration of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
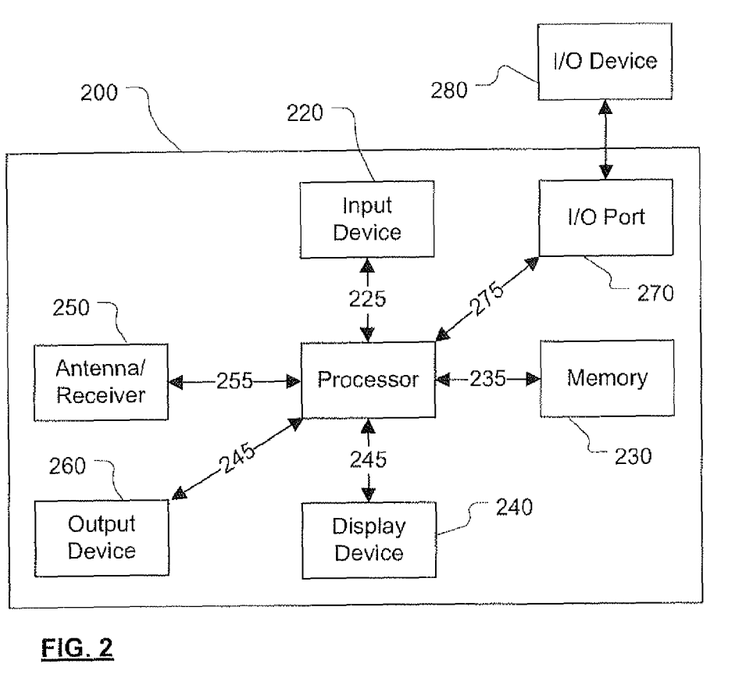
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
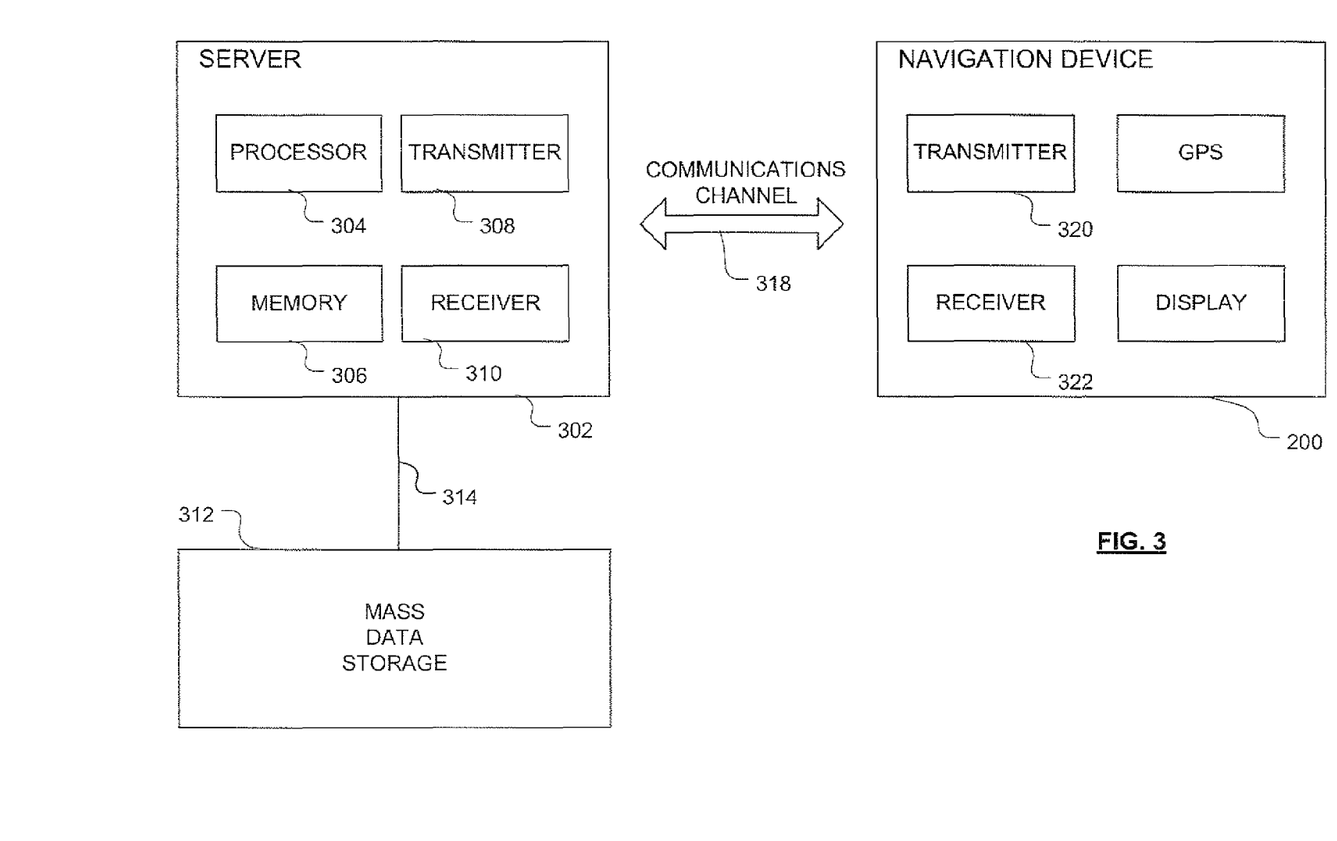
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

When a navigation device determines a route between two locations it selects a route from a number of potential paths for use in navigation. The preferred route is often selected by calculating a cost associated with each path and then selecting the path with the lowest cost. This is often done by associating one or more weighting factors with each segment of road and then combining the weighting factors of the segments of road in each path to give the total cost of the path. The weighting factors associated with a given road segment depends on which attributes are desired for the journey and which are undesired.

Figure 4:
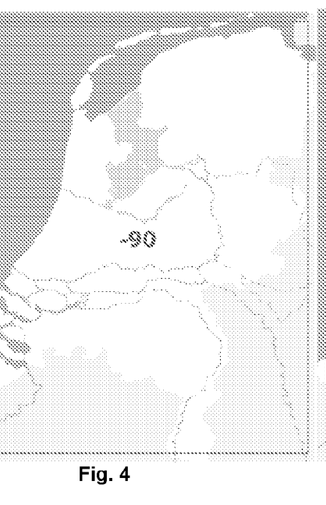
FIG. 4 represents the cost function for a first road attribute according to a conventional route finding technique.
Figure 5:
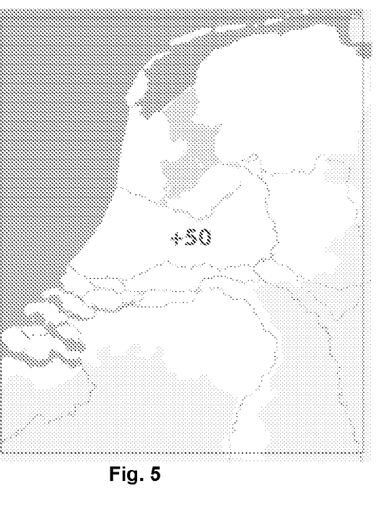
FIG. 5 represents the cost function for a second road attribute according to the conventional route finding technique.

A known technique for determining a route will now be described with reference to FIGS. 4 and 5. In this example the user has selected the category of route that is desired to be a scenic route. In order to achieve a scenic route it is desired to avoid road segments having attributes that make the route less scenic and desired to include road segments having attributes which make the route more scenic. For example, secondary roads are avoided as this type of road is often very busy. In contrast, roads in national parks will try to be used since these are often in a beautiful environment.

According to the conventional technique, all road segments in national parks would be associated with the same bonus weighting factor and all secondary roads would be associated with a fixed penalty weighting factor since they may lead to traffic congestion. As represented by FIGS. 4 and 5 respectively, each segment of secondary road within Holland receives a fixed penalty of −90 points and each road segment within a national park of Holland receives a bonus of +50 points. The routing algorithm for calculating a scenic route will calculate the cost associated with travelling along each segment of a path. As such, a road segment which is part of a secondary road within a national park would receive and overall cost of −40 points (50-90 points). This road segment would therefore have an overall penalty associated with it. In contrast, a highway may have a smaller (more positive in this example) penalty than a secondary road or may even be associated with a bonus. As such, a road segment of a highway through a national park would receive an overall cost which is more preferable for the scenic route than a segment of secondary road through a national park. The cost of all of the road segments forming a path are then combined to give the path an overall cost. The path with the lowest cost may then be considered as the optimum route between the two locations.

This conventional system for associating a weighting factor with a particular road attribute means that all segments of all secondary roads within the map receive the same penalty. Similarly, all segments of road within the national parks receive the same bonus. However, this technique may be problematic as it does not necessarily lead to the optimum route. For example, a secondary road may have significantly less traffic on it in the countryside as compared to a secondary road in a densely populated area. Also, not all roads within national parks travel through beautiful scenery.

The present invention provides an improved method of calculating routes and navigating. Rather than providing the same weighting factor (e.g. penalty or bonus) for a given type of attribute wherever the road segment is located, the present invention provides road segments having the same type of attribute with different weighting factors for that attribute depending upon where the road segment is located.

An embodiment of the present invention will now be described in which the category of route selected is a scenic route. As in the conventional technique described above, the preferred embodiment calculates the cost of a path by adding up the costs of the road segments in the path. Each segment of secondary road attracts a penalty weighting factor and each segment of national park road attracts a bonus weighting factor. However, rather than providing the same weighting factor (i.e. penalty or bonus) for each segment of secondary road and the same weighting factor for each segment of national park road, the preferred embodiment provides different weighting factors for different secondary road segments and different weighting factors for different national park road segments depending upon where the road segments are located.

Figure 6:
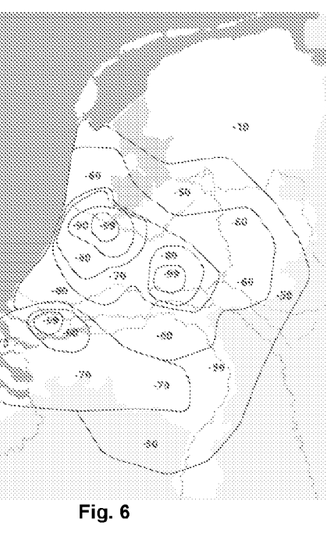
FIG. 6 represents the cost function for a first road attribute according to a preferred embodiment of the present invention.

FIG. 6 shows the cost function for the attribute of secondary roads according to a preferred embodiment. As can be seen, the map of Holland has been divided into a plurality of areas and each area has its own weighting factor. When the cost of a path is being calculated, each segment of secondary road is associated with the weighting factor corresponding to the weighting factor for the area in which the segment is located. In this example, all of the weighting factors are negative and represent penalty weighting factors, since secondary roads are deemed undesirable in all areas of the map. However, some geographical areas have more negative weighting factors and indicate more severe penalties for using secondary roads within these areas. One can see that in a scenic route the use of secondary roads is more undesirable in the densely built up areas of Holland. This is show by the areas in and around the cities of Amsterdam, Utrecht and Rotterdam being associated with very negative weighting factors (i.e. high penalties).

Although the use of secondary roads may not be very desirable in general, they are associated with less negative weighting factors (i.e. lower penalties) in some areas of the map. This is because such roads are often less busy in more rural areas. As such, secondary roads are more likely to be used in the route in these areas.

Figure 7:
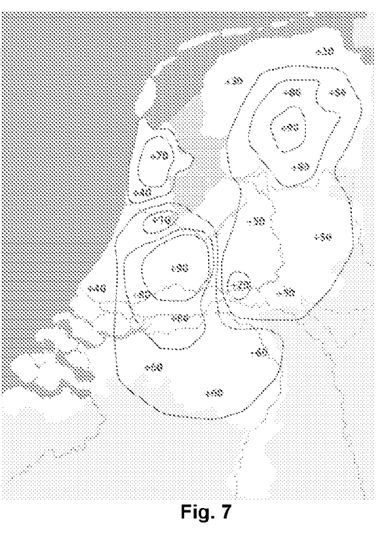
FIG. 7 represents the cost function for a second road attribute according to the preferred embodiment of the present invention.

FIG. 7 shows the cost function for the attribute of national park roads according to a preferred embodiment. As can be seen, the map of Holland has been divided into a plurality of areas and each area has its own weighting factor. When the cost of a path is being calculated, each segment of national park road is associated with the weighting factor corresponding to the weighting factor for the area in which the segment is located. In this example, all of the weighting factors are positive and represent a bonus to the cost, since national park roads are deemed desirable in all areas of the map for a scenic route. However, some geographical areas have more positive weighting factors and indicate higher bonuses for using national park roads within these areas. This is because a national park road may be more desirable to use in certain areas than others. For example, a national park may be much more appreciated in or near a big city since any type of park is more than welcome. Also, some roads in national parks may be more pleasant to use than others. For example, parts of national parks which are desserts may be seen to be less desirable to travel through. The national park roads with more positive weighting factors are more likely to be used in the scenic route.

It is to be noted that the areas in FIG. 7 do not automatically follow the contours of existing national parks or cities. In contrast, the boundary lines indicate the amount of emphasis that national park roads should have when determining the route.

Figure 8:
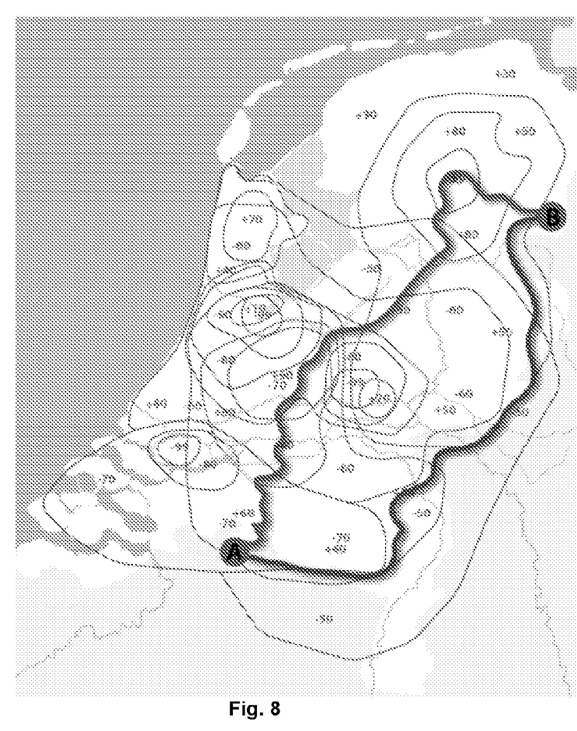
FIG. 8 depicts the superposition of the first and second cost functions of the preferred embodiment and shows two routes between two locations.

FIG. 8 shows a superposition of the cost functions shown in FIGS. 6 and 7. FIG. 8 also shows two routes between locations A and B which have been determined to be the optimum scenic routes. As will be appreciated, during determination of the routes it has been attempted to pass through the areas with higher weighting factors (higher bonus costs) for the national park roads and to avoid the areas with the lower weighting factors (more severe penalty costs) for the secondary roads.

The weighting factor and/or the area for each of the areas of each cost function may be determined based on user feedback. For example, this may be determined based on community input, e.g. people living in certain areas of the Netherlands may indicate preferred routes that avoid secondary roads and pass through national park roads. The feedback could be collected through voting systems, web sites for interest groups or could be collected and automatically provided by the navigation device.

A preferred embodiment has been described above wherein a scenic route is selected as the route category, wherein one of the road attributes is the type of road being a secondary road, and wherein another of the road attributes is the type of road being a national park road. However, the present invention is applicable to creating better routes in other route categories and with additional or other types of road attribute. For example, a route category for truck navigation may be selected. Conventionally, a routing algorithm will try to avoid every city centre in the map by applying the same cost to all road segments in all city centres. However, in reality, not all city centres are equally difficult to navigate with a truck. Some cities are less busy, have wider roads, have less one-way roads, have clearer signage for truck drivers etc. This information can be used to create a non-uniform cost function for the city-centre type of attribute.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

The invention claimed is:

1. A method of determining a route between two locations in a navigation device using a digital map comprising a number of line segments, wherein each path between the two locations is considered to be formed of a plurality of line segments and at least some of said line segments forming the paths have at least a first type of attribute and a second type of attribute associated therewith, the method comprising:

providing a first cost function for the first type of attribute, the first cost function generated by dividing a map into a first plurality of areas and assigning a first weighting factor to each area in the first plurality of areas, each first weighing factor usable to determine a separate cost for each line segment within a corresponding area based on the first type of attribute for that line segment, wherein at least some of the first plurality of areas have different first weighting factors;

providing a second cost function for the second type of attribute, the second cost function generated by dividing the map into a second plurality of areas and assigning a second weighting factor to each area in the second plurality of areas, each second weighing factor usable to determine a separate cost for each line segment within a corresponding area based on the second type of attribute for that line segment, wherein at least some of the second plurality of areas have different second weighting factors;

determining, using the first cost function and the second cost function, costs associated with each line segment of a plurality of line segments that are candidates for a route between two locations, the determining comprising calculating a separate cost for each line segment as a combination of costs generated using a given first weighing factor and a given second weighing factor based on areas in which that line segment is located within the respective first plurality of areas and the second plurality of areas;

based on the costs associated with the plurality of line segments that are candidates for the route between the locations, determining a route between the locations that includes line segments from the plurality of line segments; and determining, based on geographical locations of the navigation device that are sensed using a location sensing system, directions for following said route as a user proceeds along said route and presenting the directions for following said route to the user via at least one of a display and a speaker.

2. A method as claimed in claim 1, further comprising selecting a category of route that requires at least one of said first and second types of attribute to be considered when determining the route.

3. A method as claimed in claim 1, wherein one of the types of attribute is the likelihood of delays in travel time along road segments, and the respective cost function provides different weighting factors indicating different amounts of expected delay in different areas.

4. A method as claimed in claim 1, wherein one of the types of attribute indicates the likelihood of delays in travel time within city or town areas and the respective cost function provides weighting factors indicating different amounts of expected delays in different cities/towns or different areas of the same city/town.

5. A method as claimed in claim 1, wherein one of the types of attribute indicates the likelihood of delays in travel time for a particular mode of transport, vehicle height, vehicle width or vehicle weight, and wherein the respective cost function indicates different amounts of expected delay in different areas.

6. A method as claimed in claim 1, further comprising:
updating the first plurality of areas, the first weighing factors, the second plurality of areas, and/or the second weighing factors depending on a time of day or night.

7. A method as claimed in claim 1, further comprising:
receiving the feedback from one or more navigation devices and/or from one or more users of navigation devices.

8. A method as claimed in claim 7, wherein the feedback is input directly into the navigation device by a user and/or the feedback is collected automatically by the navigation device.

9. A method as claimed in claim 1, wherein providing the first cost function and the second cost function is performed by a server, the server returning the first cost function and the second cost function to a navigation device to be used by the navigation device for the determining the costs associated with the plurality of line segments.

10. A method as claimed in claim 1, further comprising controlling at least one of the display and the speaker to provide, to said user, information about said determined route.

11. A method as claimed in claim 7, wherein dividing the map into the first plurality of areas and the second plurality of areas comprises:
setting at least one of size, shape, and location of at least one area based on the feedback.

12. A non-transitory computer-readable storage medium storing instructions that, when executed by a processor in a navigation device, cause the navigation device to perform a method for determining a route between two locations using a digital map comprising a number of line segments, wherein each path between the two locations is considered to be formed of a plurality of line segments and at least some of said line segments forming the paths have at least a first type of attribute and a second type of attribute associated therewith, the method comprising:

providing a first cost function for the first type of attribute, the first cost function generated by dividing a map into a first plurality of areas and assigning a first weighting factor to each area in the first plurality of areas, each first weighing factor usable to determine a separate cost for each line segment within a corresponding area based on the first type of attribute for that line segment, wherein at least some of the first plurality of areas have different first weighting factors;

providing a second cost function for the second type of attribute, the second cost function generated by dividing the map into a second plurality of areas and assigning a second weighting factor to each area in the second plurality of areas, each second weighing factor usable to determine a separate cost for each line segment within a corresponding area based on the second type of attribute for that line segment, wherein at least some of the second plurality of areas have different second weighting factors;

determining, using the first cost function and the second cost function, costs associated with each line segment of a plurality of line segments that are candidates for a route between two locations, the determining comprising calculating a separate cost for each line segment as a combination of costs generated using a given first weighing factor and a given second weighing factor based on areas in which that line segment is located within the respective first plurality of areas and the second plurality of areas;

based on the costs associated with the plurality of line segments that are candidates for the route between the locations, determining a route between the locations that includes line segments from the plurality of line segments; and determining, based on locations of the navigation device that are sensed using a location sensing system, directions for following said route as a user proceeds along said route and presenting the directions for following said route to the user via at least one of a display and a speaker.

13. A non-transitory computer-readable storage medium as claimed in claim 12, wherein the method further comprises:
selecting a category of route that requires at least one of said first and second types of attribute to be considered when determining the route.

14. A non-transitory computer-readable storage medium as claimed in claim 12, wherein one of the types of attribute is the likelihood of delays in travel time along road segments, and the respective cost function provides different weighting factors indicating different amounts of expected delay in different areas.

15. A non-transitory computer-readable storage medium as claimed in claim 12, wherein one of the types of attribute indicates the likelihood of delays in travel time within city or town areas and the respective cost function provides weighting factors indicating different amounts of expected delays in different cities/towns or different areas of the same city/town.

16. A non-transitory computer-readable storage medium as claimed in claim 12, wherein one of the types of attribute indicates the likelihood of delays in travel time for a particular mode of transport, vehicle height, vehicle width or vehicle weight, and wherein the respective cost function indicates different amounts of expected delay in different areas.

17. A non-transitory computer-readable storage medium as claimed in claim 12, wherein the method further comprises:
updating the first plurality of areas, the first weighing factors, the second plurality of areas, and/or the second weighing factors depending on a time of day or night.

18. A non-transitory computer-readable storage medium as claimed in claim 12, wherein the method further comprises:
receiving the feedback from one or more navigation devices and/or from one or more users of navigation devices.

19. A non-transitory computer-readable storage medium as claimed in claim 18, wherein the feedback is input directly into the navigation device by a user and/or the feedback is collected automatically by the navigation device.

20. A non-transitory computer-readable storage medium as claimed in claim 12, wherein the method further comprises:
receiving the first cost function and the second cost function from a server.

21. A non-transitory computer-readable storage medium as claimed in claim 12, wherein the method further comprises:
controlling at least one of the display and the speaker to provide, to said user, information about said determined route.

* * * * *